United States Patent [19]
Arosio

[11] Patent Number: 5,988,697
[45] Date of Patent: Nov. 23, 1999

[54] MECHANISM FOR UNITING VALVE PARTS

[75] Inventor: Massimo Arosio, Rivolta d'Adda, Italy

[73] Assignee: Omba S.r.l., Melzo, Italy

[21] Appl. No.: 08/881,656

[22] Filed: Jun. 24, 1997

[30] Foreign Application Priority Data

Feb. 28, 1997 [IT] Italy ................................ MI97A0442

[51] Int. Cl.$^6$ .................................................. F16L 37/28
[52] U.S. Cl. ..................... 285/124.1; 285/320; 285/394
[58] Field of Search .............................. 285/124.1, 124.2, 285/124.3, 124.4, 124.5, 320, 316, 25, 26, 394; 137/614.03; 403/320

[56] References Cited

U.S. PATENT DOCUMENTS

| | | | |
|---|---|---|---|
| 981,802 | 1/1911 | Shufflebottom et al. ........... | 403/320 X |
| 2,505,245 | 4/1950 | Hollerith ............................ | 137/614.03 |
| 5,123,446 | 6/1992 | Haunhorst et al. ............. | 137/614.03 X |
| 5,316,347 | 5/1994 | Arosio .............................. | 285/124.4 X |
| 5,415,200 | 5/1995 | Haunhorst et al. ............ | 137/614.03 X |
| 5,443,291 | 8/1995 | Stucchi et al. ................. | 137/614.03 X |
| 5,464,042 | 11/1995 | Haunhorst ....................... | 137/614.03 X |
| 5,592,970 | 1/1997 | Stucchi et al. ...................... | 135/614.03 |

*Primary Examiner*—Lynne H. Browne
*Assistant Examiner*—John R. Cottingham
*Attorney, Agent, or Firm*—Kirschstein, et al.

[57] ABSTRACT

A cam mechanism couples flat-faced, male and female couplers while minimizing the tendency of a pressurized fluid from exerting a force tending to resist the coupling. Internal valve assemblies within the couplers are maintained closed during the coupling. Once the coupling is complete, a control lever of the cam mechanism is actuated to open both valve assemblies to enable flow of the pressurized fluid.

14 Claims, 9 Drawing Sheets

MECHANISM FOR UNITING VALVE PARTS

BACKGROUND OF THE INVENTION

The invention relates to a mechanism for uniting valve parts composed of a male half and a female half, the female half comprising an inner valve stem attached to a supporting ring and a slider acted on by a spring.

It is known that in order to prevent the ingress of air or the loss of fluid when the connectors of hydraulic systems are being connected and disconnected, special connectors whose mutually opposing surfaces are without projections are used. These connectors are described as flat-faced quick-release couplings.

At present these connectors consist of two parts: a male half and a female half.

The male half has a tubular outer body with standard geometry and dimensions and a cylindrical valve body whose flat end surface closes the opening of the outer body.

The female half has a valve stem fixed by means of a valve guide to a supporting ring in order to define channels through which a fluid may flow. The supporting ring in turn is fixed to a fixed outer body.

An inner slider and an outer slider, both springloaded, are housed in the outer body, in which they can slide. The sliders open and close the fluid flow channels.

The coupling end of the outer body comprises a device for locking and releasing the male half.

The male half is coupled to the female half by pushing the ends of the outer body and valve body of the male half against the sliders and valve stem of the female half. The outer body of the male half slides into the outer body of the female half until it is locked by the locking device. The valve body of the male half, being applied against the valve stem of the female half, retreats and opens the fluid flow channels. The locking of the body of the male half by the locking device of the female half occurs simultaneously with the opening of the valves (the sliders of the female half and the valve body of the male half).

These flat-faced quick-release couplings are used as connectors in hydraulic circuits, such as the hydraulic circuits of agricultural machinery and earth levelling machines. They are used especially for connecting the hydraulic circuit of a tool to the power unit.

It frequently happens that the hydraulic circuit is disconnected by opening the connection when there is still pressurized fluid inside. Often, too, the pressure in the disconnected hydraulic circuit rises because of heating of the fluid.

In these situations there is pressurized fluid inside the disconnected male part. The male half is usually attached to the end of the hydraulic circuit of a tool that has no means of regulating the pressure.

The pressurized fluid present inside the male half exerts a force tending to oppose the opening movement of the valve body, rendering connection of the male half to the female half extremely difficult if not impossible.

It also often happens that where an operator of, say, an agricultural machine has to operate in the vicinity of the tool connected up to the latter, he will first pressurize the hydraulic circuit leading to the female half before proceeding to connect up the hydraulic circuit of the tool.

The pressure of the fluid inside the female half makes it a very difficult task to connect up the male half since the pressure of the fluid opposes the movement of the internal slider to open the fluid flow channels.

SUMMARY OF THE INVENTION

The object of the present invention is to solve the disadvantages of the prior art and make it possible for flat-faced quick-release couplings to be connected and disconnected even if pressurized fluid is present in the male half and/or in the female half.

The object is achieved with a mechanism for uniting valve parts composed of a male half and a female half, the female half comprising an inner valve stem attached to a supporting ring and a slider acted on by a spring, characterized in that a tubular sheath is fixed to the supporting ring, in that the tubular sheath is fixed to a support, in that the support rotatably accommodates a controlling cam device, in that the cam device comprises a slot in which a pin slides, in that the pin is functionally connected to a jacket, in that an outer tubular body that can slide over the outer surface of the sheath is fixed to the jacket, in that the sliding body houses at its front end an outer tubular slider acted on by a preloaded spring and in that the sliding body comprises at its front end a device for locking and releasing the male half.

In order that the cam device can be operated, a control lever is present on the exterior of the cam device.

In order that the mechanism can be locked, for example when the couplings are connected together, a device for locking and releasing the rotation is present on the cam device.

In order that the sliding pin housed in the jacket is guided with a symmetrical action, the cam device comprises plates arranged parallel to the sides of the jacket and of the support, these containing mutually aligned through slots housing the sliding pin.

If the mechanism includes a plurality of female halves, then in order to facilitate the operations of connecting the male half, the control lever is U-shaped and is fixed at its ends to the plates of the cam device.

To make the movement of the jacket smooth, the profile of the slot is an arc of a spiral.

In order to connect and disconnect the coupling halves to and from a system having, for example, several delivery and return lines, the mechanism comprises a plurality of female halves.

In order to connect the plates of the cam device to the support, a shaft extends from the centre of rotation of the first plate, the support contains a transverse through hole in which the shaft can turn, the second plate contains a through hole in the centre of rotation, the end of the shaft emerging from the support is housed in the through hole of the second plate and a fastener makes the second plate fast to the shaft.

In order to connect the cam device to the support where the support houses a plurality of female halves and is not too large, there are mutually aligned pins at the sides of the support, the plates contain through holes in the centre of rotation and the plates receive the pins of the support in the through holes.

The pins are preferably stud bolts received in blind tapped holes present in the support.

In order to connect the cam device functionally to the jacket, the sliding pin is received in the slot of the cam device, the pin has at one end a head forming a stop shoulder for the first plate, the jacket contains a through hole which receives the shank of the pin, the end of the pin that projects from the jacket is received in the slot of the second plate and the end of the pin that projects from the second plate comprises a means forming a stop shoulder.

In order to prevent the pin from coming out of the slots in the plates, the end projecting from the second plate of the pin comprises a thread ending in a stop shoulder and a nut is screwed as far as it will go onto the threaded end.

Advantageously, in order to provide a stop shoulder on the pin, the end of the pin projecting from the second plate contains a transverse through hole in which a split pin is inserted.

In order to fasten the female halves to the support, the support contains lateral parallel threaded through holes, the tubular sheaths of the female halves comprise an external thread bounded at the rear by a stop shoulder and the tubular sheaths are screwed into the through holes.

In order to guide the movement of the sliding outer body of the female half, the support contains a cylindrical seat at its front end and the cylindrical seat houses a tubular extension of the sliding outer body.

In order to prevent the ingress of fluids into the groove of the support, the front end of the support bounding the cylindrical seat contains a sealing device on its inside surface.

In order to fasten the sliding outer body to the jacket, the jacket contains lateral parallel threaded through holes, the sliding outer body comprises an external thread bounded at the rear by a stop shoulder and the outer body is screwed into the through holes.

In order to allow free travel to the collar of the locking means, the jacket contains a cylindrical seat at its front end that houses the rear end of the collar.

In order to allow the thrust spring of the outer slider to act independently of the inner slider, the tubular sheath comprises at its front end a supporting shoulder for the thrust spring of the outer slider.

In order to make a mechanism that is not too heavy, the support and the jacket are made of aluminium.

The main advantages of the invention are to be seen in the fact that the sliding body of the female half enables the male half to be connected up mechanically without the valves opening and therefore without having to overcome the resistance offered by a pressurized fluid present in the halves of the coupling. Only when the male half has been connected up by using the cam device to push back the sliding body of the female half, do the valves of the halves open and allow the fluid to flow through. Another advantage is the fact that it is possible to connect up to the female halves any male half having an outer body with standard connecting surfaces.

A further advantage can be seen in the fact that the mechanism produced in accordance with the invention can be used to operate a plurality of female coupling halves simultaneously.

BRIEF DESCRIPTION OF THE DRAWINGS

The subject devised in accordance with the present invention will be described below in greater detail and illustrated in an embodiment, provided purely by way of example, in the attached drawings, in which.

DETAILED DESCRIPTION OF THE PREFERRED EMBODIMENTS

A mechanism comprising two couplings is described below as an example.

In an alternative version the mechanism could comprise a single coupling. The mechanism preferably comprises a plurality of female coupling halves for the pipes of hydraulic circuits.

Figure 1:
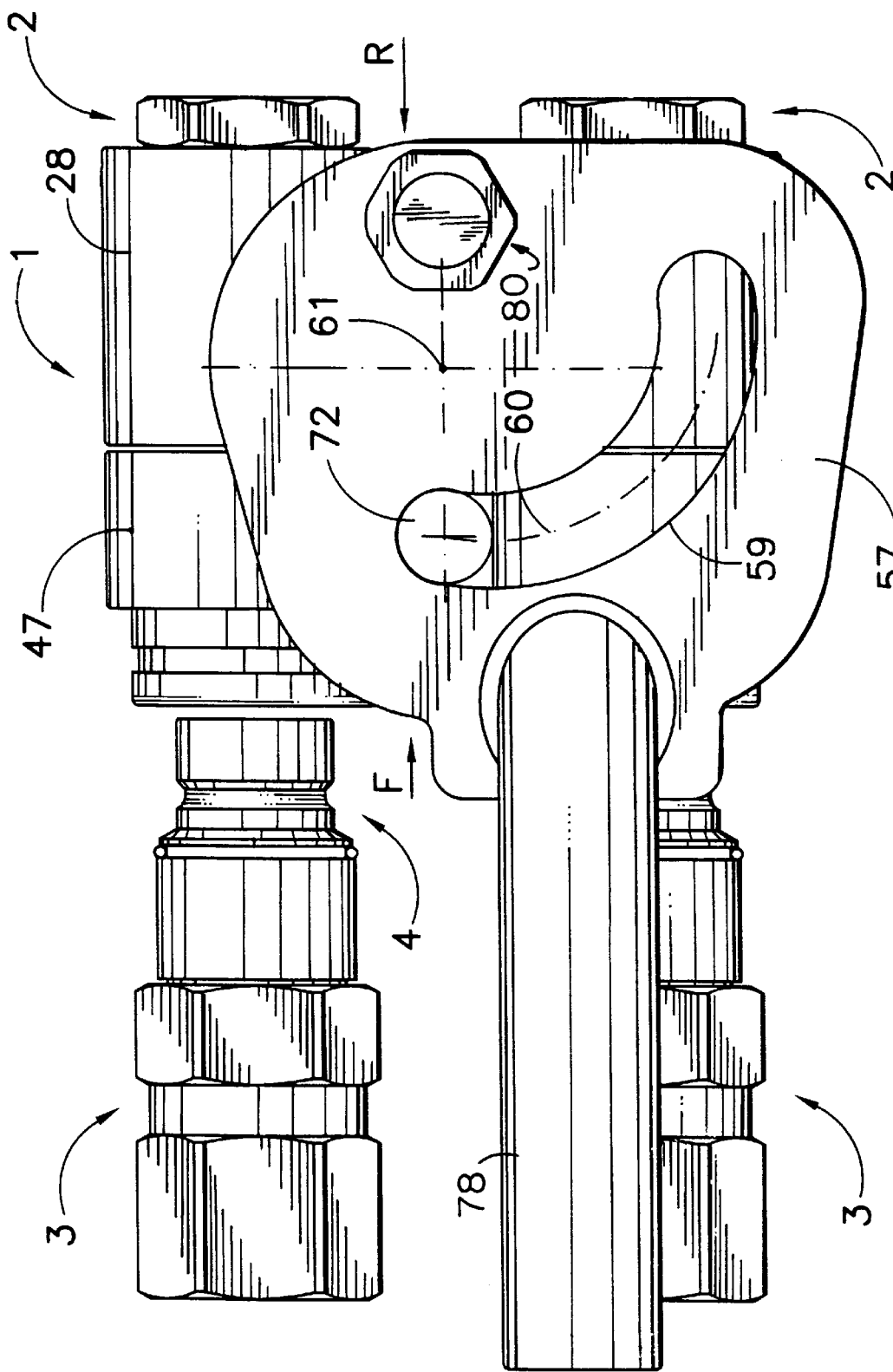
FIG. 1 shows a side view of a mechanism in the rest position with the halves unconnected.
Figure 2:
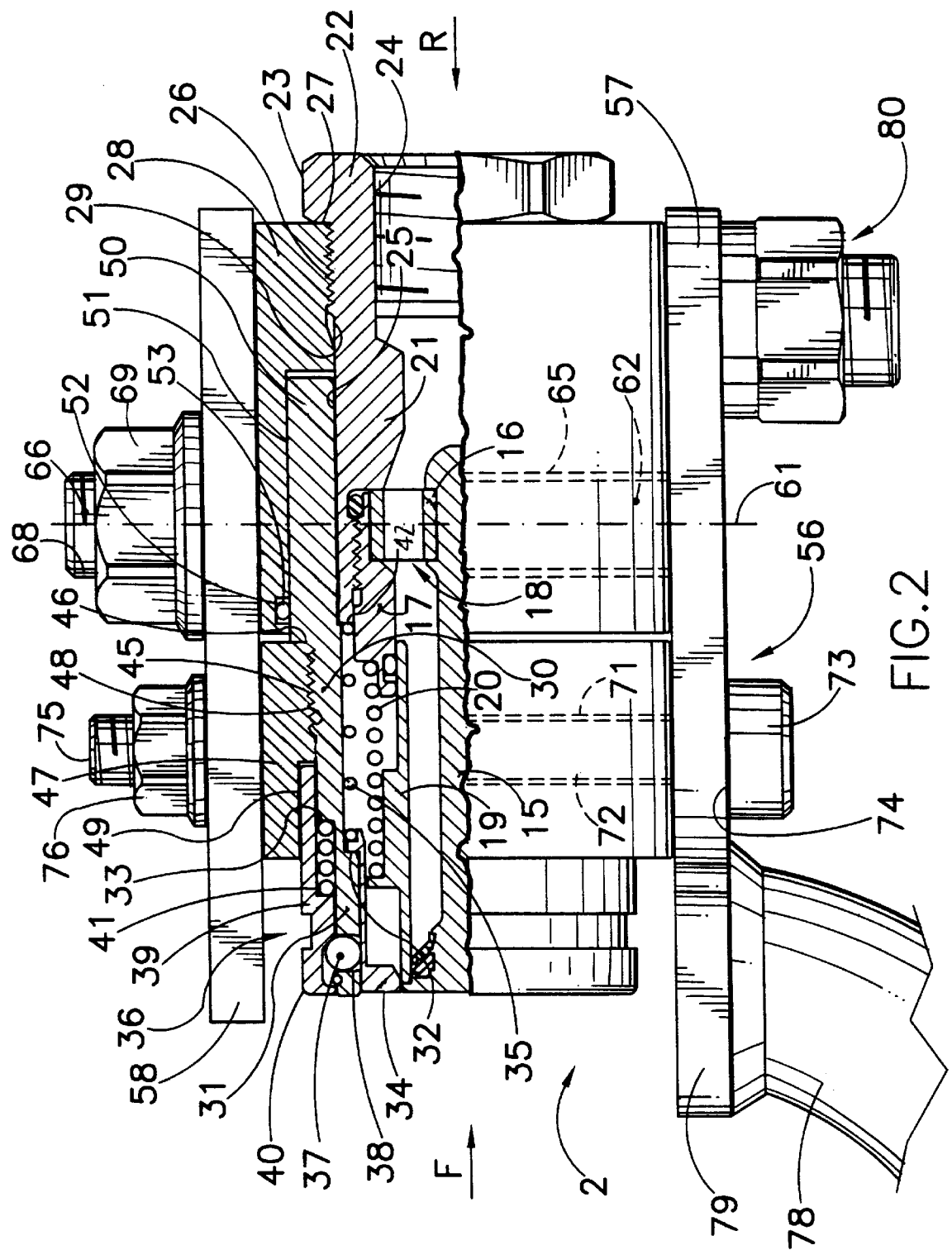
FIG. 2 shows the mechanism in a partially sectioned top view.

FIGS. 1 and 2 show the main components of the mechanism for uniting valve parts. The mechanism carries the general reference 1.

The mechanism 1 advantageously comprises female coupling halves 2 and allows male halves 3 of any construction to be connected and disconnected, provided they have a coupling end 4 of standard geometry and dimensions.

The female half 2 comprises known internal valve components. The components consist of a valve stem 15 fixed to a supporting ring 17 or inner body by an intermediate valve guide 16.

The valve guide 16 supports the valve stem 15 in the centre of the coupling half 2 and defines flow channels 18 for a fluid (the fluid is not shown).

A known slider 19 acted on by a spring 20 is present between the valve stem 15 and the supporting ring 17 to open and close the flow channels 18.

Known sealing means are interposed between the slider 19 and the stem 15, and between the slider 19 and the supporting ring 17.

The supporting ring 17 is fixed to a sheath 21 of tubular shape. The sheath 21 extends rearwards in the form of an adaptor 22 whose outer surface 23 is suitable for a spanner and whose inner surface is threaded 24 for connection to a hydraulic circuit (not shown).

The outer cylindrical surface 25 of the sheath 21 comprises a thread 26 bounded at the rear by a stop shoulder 27.

A support 28 of e.g. prismatic shape has mutually parallel lateral threaded through holes 29.

The sheath 21 fits into the through holes 29 and is fixed to the support 28 by means of the external thread 26. The thread 26 is engaged all the way in to the stop shoulder 27.

A sliding tubular outer body 30 is present in the front of the sheath 21. The sliding body 30 comprises a front end 31 with a geometry which is known per se. The end 31 comprises an internal stop shoulder 32 and an external supporting shoulder 33.

The front end 31 of the sliding body 30 houses inside itself an outer slider 34 acted on by a spring 35 in an extended position in contact with the stop shoulder 32.

Externally, the front end 31 possesses a known device 36 for the locking and releasing of the male part 1. The device 36 comprises a ring 37 of balls partly seated in holes 38 passing transversely through the sliding body 30. The through holes 38 are closed by the outer slider 34 when the latter is in the extended position. A collar 39 surrounds the ring 37 of balls with a circumferential groove 40 which both accommodates and exerts pressure on them.

A preloaded thrust spring 41 pushes against the rear of the collar 39. The other end of the spring 41 pushes against the shoulder 33 of the sliding body 30.

The sliding body 30 has an external thread behind the locking and releasing device 36. The thread 45 is bounded to the rear by a stop shoulder 46.

A jacket 47 of e.g. prismatic shape contains lateral parallel threaded through holes 48 in which the sliding outer bodies 30 are received. Each sliding body 30 is fastened by means of the thread 45 to the jacket 47. The thread 45 is screwed in as far as the shoulder 46.

In order to accommodate the collar 39 of the device 36 for the locking and releasing of the male half 1, cylindrical seats 49 coaxial with the holes 48 are provided towards the front of the jacket 47.

The sliding body 30 includes a cylindrical extension 50 at its rear end. The cylindrical extension 50 slides over the outer surface 25 of the sheath 21.

In order to allow the sliding body 30 to move freely, cylindrical seats 51 coaxial with the through holes 29 are provided in the front side of the support.

The support 28 has sealing means at the front end of the seat 51.

A circumferential groove 52 is preferably present at the front end of the support 28 that bounds the seat 51. The groove 52 contains an 0-ring seal 53.

On the sides of the jacket 47 and support 28 is a controlling cam device, or cam, bearing the general label 56. The cam device 56 comprises two opposing parallel plates 57, 58. The plates 57, 58 contain through slots 59 which are arranged in line with each other and have a profile 60. The profile 60 of the cam 56 extends around a point or centre coinciding with the axis 61 of rotation of the plates 57, 58.

The profile 60 of the cam 56 is advantageously an arc of a spiral.

A supporting rotary shaft 62 extends from that centre of rotation of the first plate 57 which lies nearest the second plate 58.

The support 28 contains a transverse through hole 65 centrally between the holes 29 containing the sheaths 21. The through hole 65 houses the shaft 62.

The end 66 of the shaft 62 that projects from the support 28 is received in a through hole 67 present in the centre of rotation of the second plate 58.

The end 66 of the shaft 62 that projects from the second plate 58 has means for fastening it to the second plate 58.

The end 66 of the shaft 62 preferably has a thread 68 extending as far as the section of shaft 62 housed in the second plate 58.

A nut 69 is screwed onto the end 66 of the shaft 62. The nut 69 is screwed tightly against the second plate 58 to make the plate 58 fast to the shaft 62.

The plates 57, 58 are connected rigidly to each other in such a way that the profiles 60 and the slots 59 are parallel and in line with each other.

The jacket 47 contains a transverse through hole 71 centrally between the holes 48 containing the sliding bodies 30 of the female halves 2.

A pin 72 is accommodated in the transverse hole 71 in the jacket 47.

The ends of the pin 72 that project from the jacket 47 pass through and can slide in the slots 59 formed in the plates 57, 58.

The end of the pin 72 that projects from the slot 59 of the first plate 57 has a head 73 forming a stop shoulder 74 for the first plate 57.

The end of the pin 72 that projects from the second plate 58 has a thread 75. The thread 75 is bounded by a stop shoulder (not shown) which is present on the outside of the slot 59. A nut 76 fits onto the threaded end of the pin 72. The nut 76 is screwed along the thread 75 as far as it will go so that the pin 72 is free to slide in the slots 59 of the plates 57, 58.

A control lever 78 is present on the outer side of one end 79 of the first plate 57.

A known device 80 for preventing and allowing the rotation is present on the first plate 57 at the opposite end from the control lever 78.

The front end of the sheath 21 forms a supporting shoulder 42 for the thrust spring 35 of the outer slider 34.

Advantageously the support and jacket, and also the plates 57, 58 of the cam device 56, are made from a strong, lightweight material such as aluminium, for example.

The thrust springs 20, 35, 41 of the sliders 19, 34 and of the collar 39 are preferably preloaded.

The mechanism 1 can be constructed so as to accommodate one female coupling half 2 only.

The mechanism 1 preferably has a plurality of female coupling halves 2 with one controlling cam device 56 only.

Figure 9:
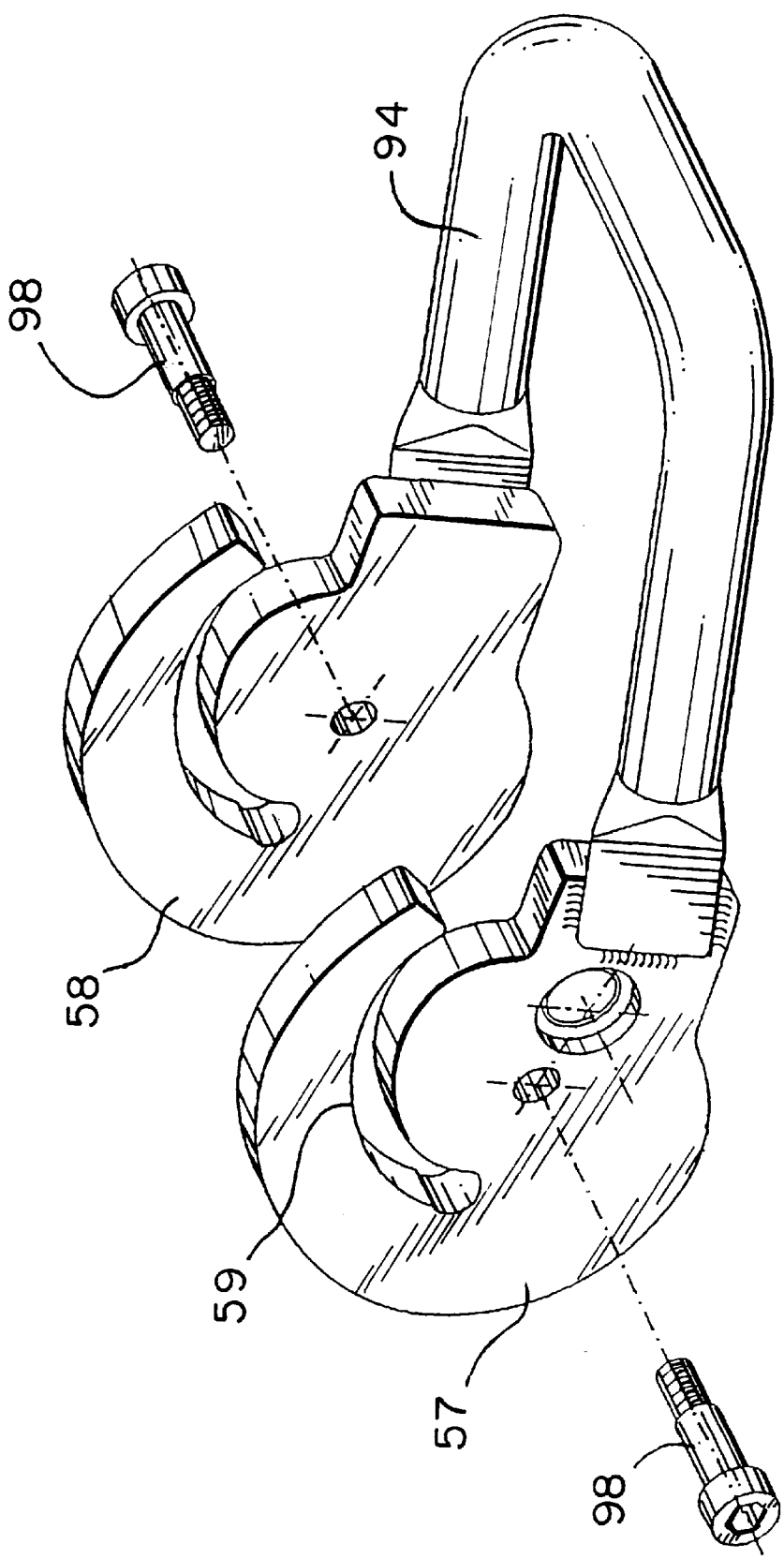
FIG. 9 shows an exploded isometric view of a second embodiment of the cam device.

If so, the cam device 56 is advantageously fixed to the support 28 by means of pins, which may for example be stud bolts 93 held in through holes formed in the centres 61 of rotation of the plates 57, 58 (FIG. 9).

The bolts 98 each have a head providing a shoulder for the plates 57, 58. The end of each bolt 98 has a thread which fits into blind threaded holes (not shown) formed on the sides of the support 28. The blind threaded holes are coaxial.

The bolts 98 are fastened to the support 28 and leave the plates 57, 58 free to rotate.

A U-shaped control lever 94 is advantageously present for operating the cam device 56. The lever 94 is fixed by its ends to the sides of the plates 57, 58 in such a way so as not to interfere with the operations of connecting the male coupling halves, or with the pipes of the hydraulic circuit.

Figure 3:
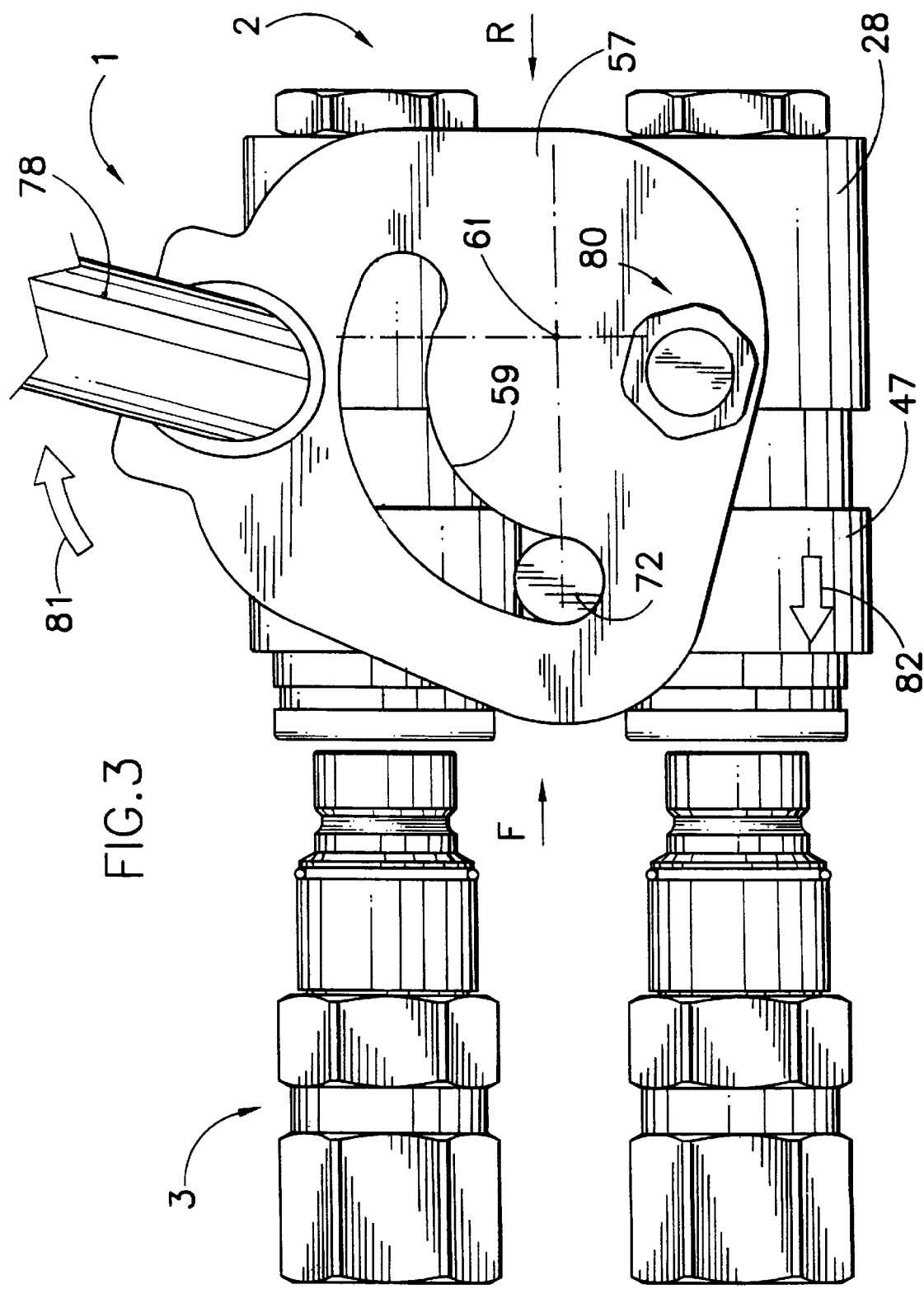
FIG. 3 shows a side view of the first step of connecting the coupling, in which the female half can be seen with the sliding outer body in the extended position.
Figure 4:
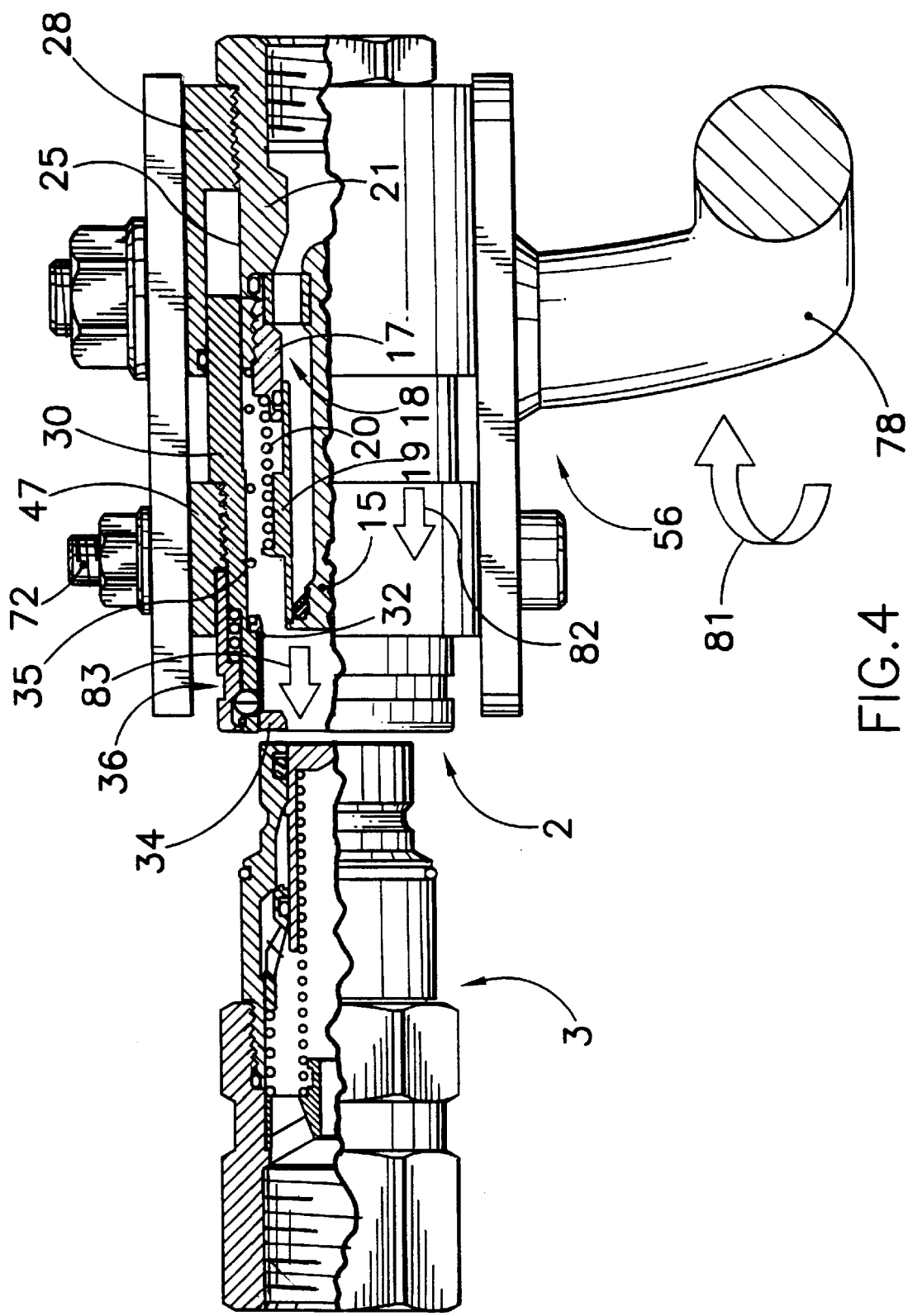
FIG. 4 shows a partially sectioned top view of the connecting step illustrated in FIG. 3.

The first step in the coupling together of the connectors will now be described with the aid of FIGS. 3 and 4.

After operating the device 80 to release the plate 57 so that it can rotate, the user acts on the control lever 78 so as to turn (see arrow 81) the cam device 56 anticlockwise. The pin 72 slides along the inside of the slots 59, moving away from the centre 61 of rotation and hence from the support 28 in the process.

Under the action of the sliding pin 72 the jacket 47 moves forwards (see arrow 82). The sliding body 30 of the female half 2, being fixed to the jacket 47, moves forwards (see arrow 83).

During the advance of the sliding body 30, the outer slider 34 remains in the extended position in abutment against the shoulder 32 because of the action of the thrust spring 35.

During this step, moreover, the slider 19 does not move. The slider 19 acted on by the thrust spring 20 remains in an extended position such that the fluid flow channels 18 are closed.

In this way the sliding outer body 30 advances without opening the valves of the female half 2 so as to accommodate the male half 3 and be locked onto it by means of the locking device 36.

Figure 5:
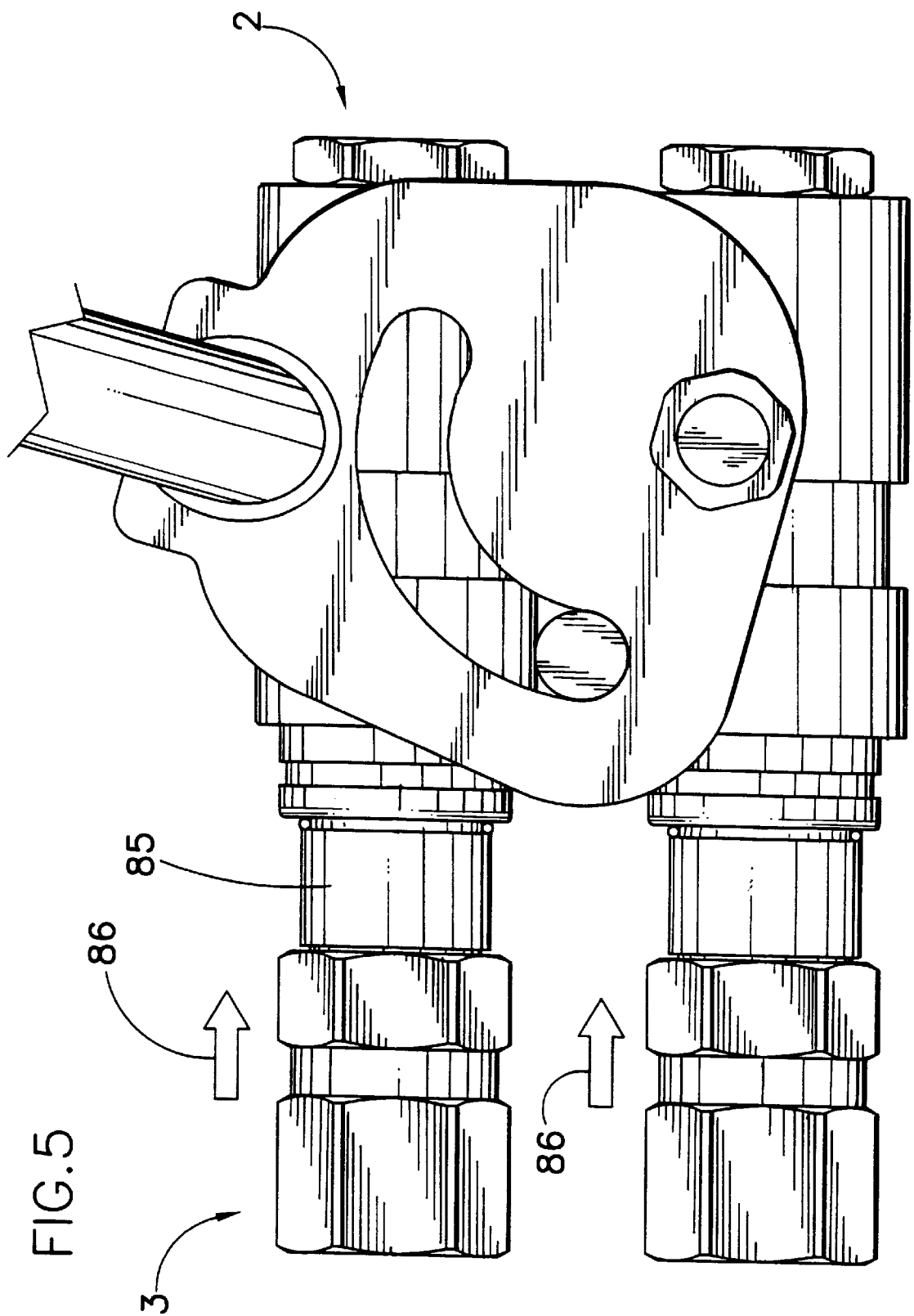
FIG. 5 shows a side view of the second step of connecting the coupling, with the male half inserted and locked inside the female half.
Figure 6:
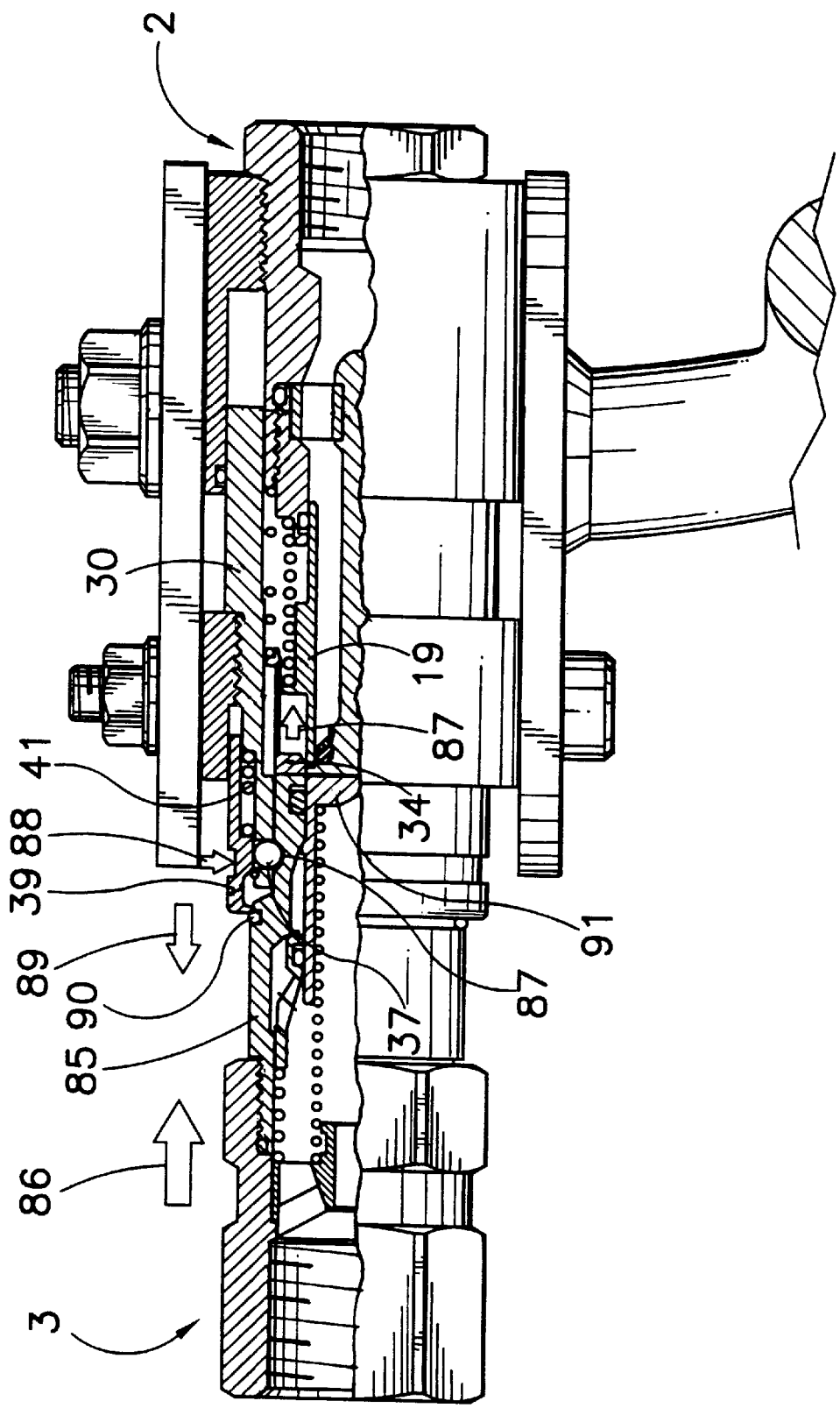
FIG. 6 shows a partially sectioned top view of the connecting step illustrated in FIG. 5.

The second step of the connecting of the male half 3 to the female half 2 can be considered with the aid of FIGS. 5 and 6.

By pushing the flat front surface of the male half 3 against the outer slider 34, the body 85 of the male half 3 is inserted inside the sliding outer body 30 of the female half 2 (see arrow 86).

The insertion of the male half 3 into the sliding body 30 causes the outer slider 34 to move back (see arrow 87). As the male half 3 moves further into the sliding body 30, the ring 37 of balls rolls along the outer surface of the slider 34 and then along that of the outer body 85 until it drops into a locking groove 87 present around the body 85 of the male half 3 (see arrow 88).

By dropping into the locking groove 87 the ring 37 of balls releases the collar 39, which, pushed by the spring 41 (see arrow 89), slides forwards until it meets a shoulder 90 and closes the tops of the holes 38.

As a result of the extended position of the sliding body 30 of the female half 2 it is possible to lock the male half 3 without opening the valves, which latter are formed by the slider 19 and a known valve body 91 belonging to the male half 3.

Figure 7:
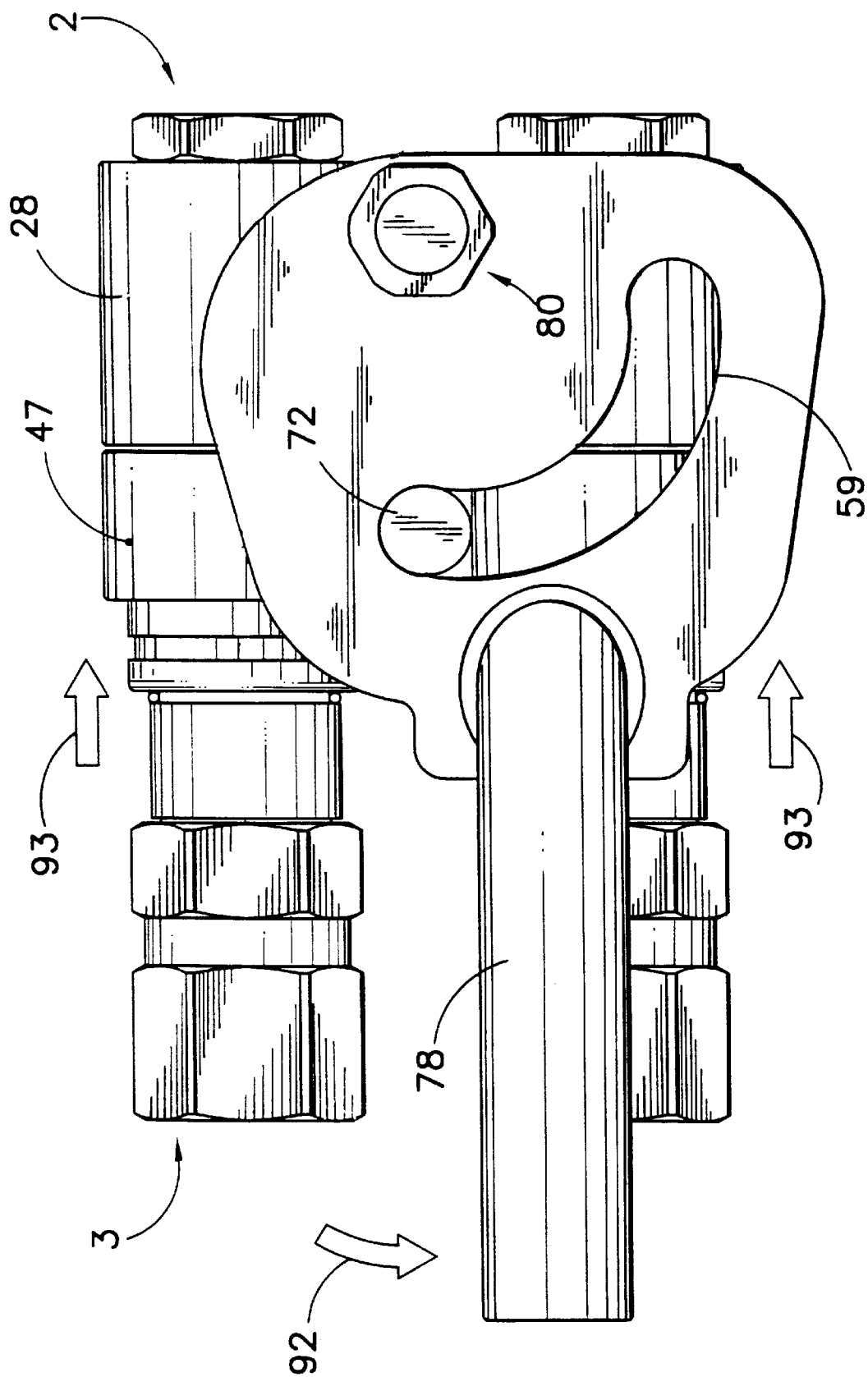
FIG. 7 shows a side view of the third step of connecting the coupling, with the sliding outer body of the female half in the retracted position.
Figure 8:
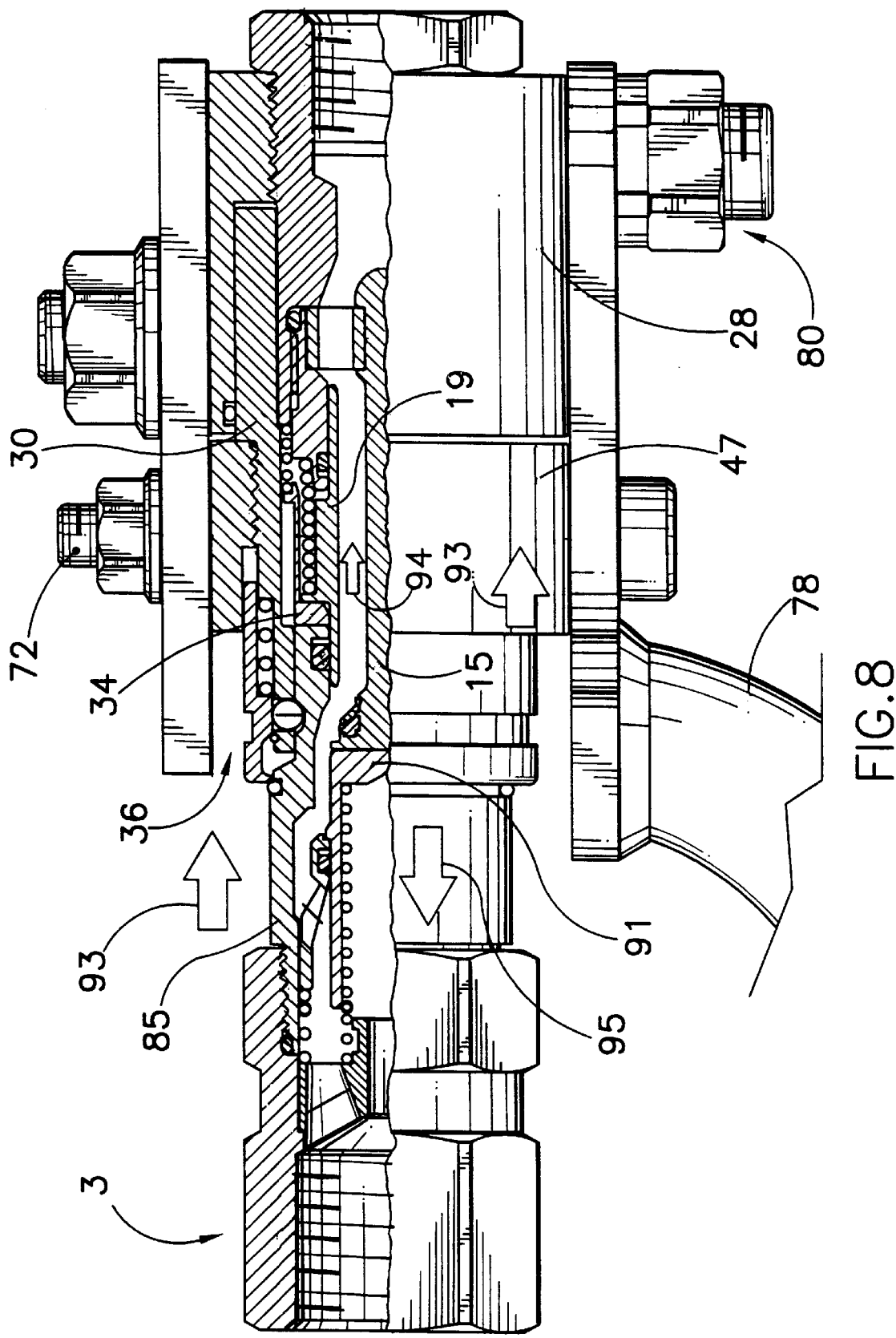
FIG. 8 shows a partially sectioned top view of the connecting step illustrated in FIG. 7.

The step of opening the valves of the male half 3 and female half 2 can be followed in FIGS. 7 and 8.

An anticlockwise rotation (see arrow 92) of the control lever 78 causes the pin 72 to slide in the slot 59 and move the jacket 47 (see arrows 93) towards the support 28.

This retracts the sliding body 30 which is locked by the locking device 36 onto the male half 3. The body 85 of the male half 3 and the corresponding valve body 91 are in abutment against each other and push the outer slider 34 and valve stem 15 of the female half 2.

Being pushed along by the outer body 85 of the male half 3, the outer slider 34 meets the slider 19, which moves backwards (see arrow 94) and opens the fluid flow channels 18 of the female half 2.

Being pressed against the valve stem 15, which remains stationary, the valve body 91 of the male half 3 retreats inside the outer body 85, thereby opening the flow channels of the male half 3.

The operations of disconnecting the male half 3 from the female half 2 and hence of opening the connector of the hydraulic circuit are performed by repeating the steps described above in reverse order.

A clockwise rotation of the control lever 78 recloses the valves of the coupling halves 2, 3 by extending the valve body 91 and the slider 19 and extends the sliding body 30 locked onto the outer body 85 of the male half 3.

The collar 39 is pushed back to align the groove 40 with the holes 38, allowing the ring 37 of balls to emerge from the locking groove 87, and releasing the outer body 85 of the male half 3.

It is then possible, by an anticlockwise rotation of the cam device 56, to retract the jacket 47 and the sliding body 30 and so return the mechanism 1 to the rest position.

I claim:

1. A mechanism for coupling and uncoupling a flat-faced male coupler having an internal male valve assembly which has a male valve member movable along a longitudinal axis between open and closed states, and a flat-faced female coupler having an internal female valve assembly which has a female valve member movable along the longitudinal axis between open and closed states, in the presence of pressurized fluid which is located within the couplers and which exerts a force tending to resist the coupling, the mechanism comprising:

a cam device including
 a) a support mounted on the female coupler for pivoting movement about a pivot axis perpendicular to the longitudinal axis;
 b) an eccentric slot formed in the support;
 c) a pin mounted in the slot for movement along the slot, the pin being adapted to be operatively connected to the female valve member; and
 d) a control lever connected to the support for pivoting the support in one circumferential direction about the pivot axis and moving the pin in one direction along the slot for moving the female valve assembly along the longitudinal axis into locking engagement with the male valve assembly, both valve assemblies being adapted to be maintained in the closed states throughout the pivoting of the lever in said one circumferential direction to prevent the pressurized fluid from interfering with the coupling of the couplers, and
 e) the control lever being also operative for pivoting the support in an opposite circumferential direction about the pivot axis and moving the pin in an opposite direction along the slot for jointly moving the female valve member and the male valve member to the open states to enable flow of the pressurized fluid only after the coupling of the couplers has been completed.

2. The mechanism of claim 1, wherein the support includes a pair of support plates in mutual parallelism and situated at opposite sides of the female coupler, and wherein the pin extends through the plates.

3. The mechanism of claim 1, wherein the cam device includes a lock for locking and releasing the movement of the support by the lever.

4. The mechanism of claim 2, wherein the lever is a linear handle.

5. The mechanism of claim 3, wherein the lever is a U-shaped handle having opposite ends connected to both plates.

6. The mechanism of claim 1, wherein the female valve assembly includes an inner valve stem, a supporting ring attached to the inner valve stem; and wherein the female valve member is an inner slider bounding a fluid passage with the inner valve stem; and wherein the female valve assembly includes a first spring bearing on the supporting ring and the inner slider to urge the inner slider to block the fluid passage in the closed state.

7. The mechanism of claim 6, wherein the female coupler includes a tubular sheath fixed to the supporting ring, and a support member fixed to the tubular sheath, and wherein the cam device includes a pivot shaft extending along the pivot axis and through the support member.

8. The mechanism of claim 7, wherein the female valve assembly includes an outer tubular body surrounding and movable relative to the tubular sheath, and a jacket fixed to and jointly movable with the outer tubular body, and wherein the pin is operatively connected to the jacket.

9. The mechanism of claim 8, wherein the female valve assembly includes an outer tubular slider mounted on the outer tubular body for movement relative thereto, and a second spring bearing on the outer tubular slider and the tubular sheath for urging the outer tubular slider away from the tubular sheath.

10. The mechanism of claim 9, wherein the outer tubular body has an end connector for locking onto the male coupler.

11. The mechanism of claim 10, wherein the jacket has a hole through which the pin extends, and wherein the pin jointly moves the jacket and the outer tubular body during pivoting of the lever in said one circumferential direction.

12. The mechanism of claim 11, wherein the male valve member lockingly engages the end connector of the outer tubular body, and wherein the pin jointly moves the jacket, the outer tubular body, the end connector and the male valve member during pivoting of the lever in said opposite circumferential direction; and wherein the male valve member abuts against and pushes the outer tubular slider and the inner slider to unblock the fluid passage.

13. The mechanism of claim 12, wherein the support member and the jacket are constituted of aluminum.

14. The mechanism of claim 1, wherein the mechanism includes additional flat-faced female couplers.

* * * * *